United States Patent Office 3,143,522
Patented Aug. 4, 1964

3,143,522
METHOD OF GRAFTING STYRENE ONTO BUTADIENE-STYRENE POLYMER
Wendell R. Conard, Kent, and Robert J. Reid, Canal Fulton, Ohio, assignors to The Firestone Tire & Rubber Company, Akron, Ohio, a corporation of Ohio
No Drawing. Filed May 19, 1961, Ser. No. 111,161
1 Claim. (Cl. 260—45.5)

This invention relates to a novel method of grafting styrene onto an elastomeric polymer to make a high-impact styrene, using a particular catalyst.

High-impact polystyrenes and the like are usually made by one of the following general procedures:

(1) Latex blending of polystyrene latex and rubber latex.
(2) Mill blending of polystyrene and rubber.
(3) Bulk polymerization of a solution of styrene and rubber.
(4) Emulsion polymerization of styrene in rubber latex.

The elastomeric polymer from which, according to this invention, high-impact polystyrene is produced by copolymerization in styrene, is obtained from a diene of 4 to 5 carbon atoms and up to 40 percent of styrene. Thus, it may be a homopolymer of butadiene, isoprene or piperylene, a copolymer of two or more of these, or a copolymer of styrene with butadiene-1,3, isoprene or piperylene. It may be a mixture of two or more of these. It may be an emulsion polymer or in the case of the polydienes, they may be solution polymers in which any catalyst may be used to produce a polymer having a preferred microstructure, i.e. a polymer in which the molecular structure is highly linear.

According to this invention a product having high impact strength is obtained by copolymerizing such an elastomeric polymer in styrene using phenylcyclohexane hydroperoxide as a catalyst. Surprisingly, this particular catalyst produces a product with high impact strength. A suspension is prepared from the solution of the elastomer in styrene, by mixing therewith an aqueous solution of a partially hydrolyzed polyvinyl acetate, such as a commercial polyvinyl alcohol.

The polyvinyl alcohol used herein is readily prepared by the hydrolysis of polyvinyl actetate and can vary in molecular weight and degree of hydrolysis. The percent hydrolysis can vary from 75 to 95, and the viscosity (a measure of molecular weight) of a 4 percent solution in water at 20° C. can vary from about 4 to about 50 centipoises. The preferred polyvinyl alcohol is 85 to 90 percent hydrolyzed, and a 4 percent aqueous solution has a viscosity of 20 to 25 centipoises. A mixture of polyvinyl alcohols can be used.

Aquarex G (sodium alkane sulfonate) or other surface-active agent is advantageously added to reduce the surface tension of the water phase.

Phenylcylohexane hydroperoxide, the catalyst, has the formula:

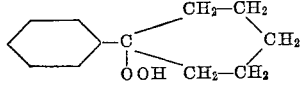

In the above formula one or more hydrogens can be substituted on either ring by one or more lower alkyl groups and/or one or more hydrogens on the phenyl group can be substituted by chlorine. For example, p-tolyl-4-methylcyclohexane hydroperoxide is a suitable catalyst. The amount of catalyst used will be 0.01 to 2.0 parts per 100 parts of the combined weight of the elastomer and the styrene. At higher temperatures, less catalyst is required than at lower temperatures. Temperatures in the range of 35 to 130° C. can be used. A preferred temperature range is about 50 to 100° C., and in this temperature range, 0.05 to 0.5 part of catalyst is satisfactory. As the catalyst is not soluble in water, it is incorporated in the styrene-rubber solution.

In producing the graft, 2 to 25 percent of the elastomeric polymer is dissolved in 98 to 75 percent of styrene, and then suspended in water and polyvinyl alcohol with the addition of catalyst, etc. One hundred parts of the solution are suspended in 100 to 300 parts by weight of water and 0.1 to 3.0 parts of the partially hydrolyzed polyvinyl alcohol, preferably using 0.001 to 0.1 part of a surface-tension reducer. The suspension is heated, and with agitation all of the styrene is polymerized in the presence of the elastomeric polymer. Parts and percentages are by weight.

The following examples are illustrative:

*Example 1*

The elastomer was a butadiene-styrene emulsion copolymer (SBR) containing 23 percent of bound styrene and having a Mooney of 50 (ML-4). A 10 percent solution of this elastomer in styrene (distilled polymer grade) was prepared. The polymerization mixture was made up of—

Aforesaid elastomer solution _____ 200 grams.
Water _____ 244 grams.
Polyvinyl alcohol (Elvanol 52-22) _____ 1 gram.
Aquarex G _____ 0.04 gram.
Catalyst _____ Variable.

A bottle containing the foregoing composition was polymerized by agitation in a water bath at 70° C. for five days. The suspended polymer product (the desired high-impact plastic) was filtered off and dried over night at 70° C. The dried plastic, which weighed 200 grams, was milled with the following:

Grams
Butylated bisphenol A (anitoxidant) _____ 1.0
Calcium stearate _____ 1.0
Alkylated polyhyroxyphenol (stopping agent) _____ 0.2

The milling was continued for 8 minutes, using 40 p.s.i.g. steam on a 6″ x 12″ mill. The stock temperature was substantially 325 to 340° F.

A number of identical suspension copolymerizations were carried out except for the following variations: (1) different catalysts were used, (2) different amounts of the catalyst of this invention were used, and (3) the catalyst of this invention was used with additions. The results are recorded in the following table. The indicated amounts of the different catalysts were added to 100 parts of the foregoing 10 percent solution of elastomer in styrene, instead of the stated amount of phenylcyclohexane hydroperoxide. The impact strengths are given in foot pounds.

| Catalyst, etc. | Rockwell hardness | | Impact strength, ft.-lbs. | | Plasticity, sq. mm. | Extrusion smoothness |
|---|---|---|---|---|---|---|
| | R | M | RT[1] | 0° C. | | |
| 0.2 benzoyl peroxide | 101 | 24 | 0.8 | | 2,280 | Very rough. |
| 0.2 lauroyl peroxide | 100 | 20 | 1.2 | 0.06 | 2,370 | Do. |
| 0.2 diisopropyl-benzene hydroperoxide | 100 | 23 | 1.0 | | 2,210 | Moderately rough. |
| 0.2 acetyl peroxide | | | low conversion | | | |
| 0.2 MEK[2] peroxide | 100 | 27 | 0.9 | | 2,160 | Rough. |
| 0.2 PcHP[3] | 96 | 20 | 4.1 | 0.8 | 2,190 | Fairly smooth. |
| 0.2 di-t-butyl peroxide | | | | | | |
| 0.2 (2,4-dichlorobenzoyl) peroxide | | | Low conversion | | | |
| 0.2 dicumyl peroxide | | | | | | |
| 0.2 cumene hydroperoxide | 101 | 23 | 0.8 | | 2,170 | Moderately rough. |
| 0.2 paramenthane hydroperoxide | 100 | 21 | 1.0 | | 2,100 | Rough. |
| 0.2 cyclohexanone hydroperoxide | 100 | 21 | 1.0 | | 1,940 | Do. |
| 0.2 PcHp[3] | 94 | 15 | 4.0 | | 2,320 | Fairly smooth. |
| 0.3 PcHp[3] | 95 | 15 | 1.5 | | 2,410 | Smooth. |
| 0.15 PcHp[3]+0.012 DDM.[4] | 96 | 18 | 4.1 | 1.3 | 2,320 | Fairly smooth. |
| 0.15 PcHp[3]+0.05 DDM | 99 | 21 | 1.0 | | 2,300 | Do. |
| 0.2 PcHp[3]+0.1 divinyl benzene | 92 | 11 | 0.7 | | 2,140 | Rough. |

[1] RT stands for room temperature.
[2] MEK stands for methylethyl ketone.
[3] PcHp stands for phenylcyclohexane hydroperoxide.
[4] DDM stands for dodecyl mercaptan.

The Rockwell hardness values were determined in the usual manner. The impact strength figures refer to Izod Notched Impact determinations. The plasticity figures represent areas in sq. mm. from plaques derived from ½ gram samples pressed at 180° C. for 30 seconds in a Carver hydraulic press, at 2000 pounds per square inch.

The polyvinyl alcohol produced the best suspension, but without the Aquarex G it contained a small percentage of objectionable fine material. The plastic produced with phenylcyclohexane hydroperoxide gave by far the highest impact strength and the best extrusion smoothness. An increase from 0.2 to 0.3 part of the catalyst improved the smoothness, but the impact strength dropped somewhat. The addition of dodecyl mercaptan (DDM in the table) with reduction in the amount of catalyst caused a drop in the impact strength of the plastic. Divinyl benzene which is used to smooth out certain extruded rubbers, produced a rougher stock with low impact strength. Lowering the elastomer content also lowered the impact strength.

Prolonged milling produced a drop in the impact strength. Lubricants tried did not improve extrusion smoothness.

The following table records data on the use of phenylcyclohexane hydroperoxide in a different experiment, using a 7.5 percent solution of the same SBR in styrene; but otherwise using the formulation of Example 1.

| Catalyst | Rockwell hardness | | Impact strength, ft.-lbs., RT | Plasticity, sq. mm. | Extrusion smoothness |
|---|---|---|---|---|---|
| | R | M | | | |
| 0.2 PcHp | 101 | 24 | 1.2 | 2,260 | Fairly smooth. |
| 0.3 PcHp | 102 | 26 | 0.8 | 2,430 | Smooth. |

This table shows that the increase in the concentration of the catalyst produced lower molecular weight polymer and poor impact strength.

As is indicated in the above specific examples a catalyst range of about 0.1 to 0.3 part of the PcHp was satisfactory at a polymerization temperature of about 70° C. It is also preferable to use less than about 0.05 part of a mercaptan modifier and substantially no cross-linking agent (e.g., divinyl benzene) during polymerization. For purposes of comparison it is noted that conventional polystyrene exhibits an impact strength at room temperature of 0.2 to 0.3 foot pound and only about 10 percent of this value at 0° C.

It was unexpected that the phenylcyclohexane hydroperoxide would produce products of high-impact strength. Modifications in the formulation and procedure given above are included in the invention, as will be apparent to those skilled in the art.

What we claim is:

Method of producing a high-impact styrene plastic consisting essentially of styrene and butadiene, which method comprises dissolving 2 to 25 percent of an elastomeric polymer of 100 to 60 percent of butadiene and up to 40 percent of styrene, in 98 to 75 percent, respectively, of styrene, then forming a suspension with 100 parts of this solution using 100 to 300 parts of water and 0.1 to 3.0 parts of polyvinyl alcohol, and polymerizing the styrene at 35 to 135° C. in the presence of the elastomeric polymer with 0.2 part of phenylcyclohexane hydroperoxide as catalyst.

References Cited in the file of this patent

UNITED STATES PATENTS 2,886,553    Stein et al. _____ May 12, 1959
2,939,852    Schmidle _____ June 7, 1960

OTHER REFERENCES

Emulsion Polymerization, volume IX, by Bovey et al. (1955), page 14.